UNITED STATES PATENT OFFICE.

ALWIN MITTASCH AND HUGO MORAWITZ, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCING AMMONIUM SULFATE.

1,091,234.

Specification of Letters Patent. Patented Mar. 24, 1914.

No Drawing. Application filed October 20, 1913. Serial No. 796,120.

*To all whom it may concern:*

Be it known that we, ALWIN MITTASCH and HUGO MORAWITZ, citizens of the German Empire, residing at Ludwigshafen-on-the-Rhine, Germany, have invented new and useful Improvements in Producing Ammonium Sulfate, of which the following is a specification.

The oxidation of ammonium sulfite in solution by means of oxygen or air proceeds generally so slowly that it has hitherto been preferred to obtain the salt in the solid state and then oxidize it in order to convert it into ammonium sulfate.

We have now found that the oxidation of ammonium sulfite in the form of solution can be carried out easily and rapidly by treating the solution with oxygen, for instance with pure oxygen, or air, in the presence of a body which is capable of acting as an oxygen carrier, while maintaining the solution alkaline with ammonia. As examples of suitable oxygen carriers we mention porous substances such as carbon, fire-clay, pumice stone, ferric oxid and manganese dioxid, mixtures can also be employed, for instance the oxygen carrier may contain platinum, manganese compounds, iron compounds, or cerium compounds, and it is possible according to our invention to employ in the solid state oxygen carriers or catalysts which are soluble in acid.

The oxidation herein referred to is preferably carried out at a raised temperature and, if desired, the production of the solution and its oxidation can be carried out in the same apparatus. The ammonium sulfite solution can also contain some solid ammonium sulfite, which latter during the oxidation gradually goes into solution and then becomes oxidized. A simple method of maintaining the solution alkaline is to add ammonia repeatedly or continually. The process according to our invention readily permits of the production of saturated or even of supersaturated solutions of ammonium sulfate, from which the solid sulfate then separates out in a pure state.

It is often advantageous to carry out the process of our invention under increased pressure, since the reaction then proceeds even more rapidly and complete oxidation can be obtained in a very short time when using either oxygen or even air as the oxidizing agent.

The following example will serve to illustrate further the nature of our invention, but the invention is not confined to this example.

Place concentrated ammonium sulfite solution containing a small excess of ammonia in an autoclave containing pieces of porous clay coated with manganese hydroxid and then, while maintaining a temperature of or about 80° C. and a pressure of or about 20 atmospheres, pass a current of air through the solution. It is preferred to add a little ammonia to the air in order to replace the small quantities of ammonia which pass away with the gases from the autoclave and which can be readily recovered in any suitable manner. If desired, two or more autoclaves can be connected in series.

Now what we claim is:—

1. The process of producing ammonium sulfate by treating ammonium sulfite in solution with oxygen in the presence of an oxygen carrier while maintaining the solution alkaline with ammonia.

2. The process of producing ammonium sulfate by treating ammonium sulfite in solution with oxygen in the presence of an oxygen carrier while maintaining the solution alkaline with ammonia and while carrying out the reaction under increased pressure.

3. The process of producing ammonium sulfate by reacting on ammonium sulfite with oxygen in the presence of porous clay covered with manganese hydroxid and of an excess of ammonia.

4. The process of producing ammonium sulfate by reacting on ammonium sulfite with oxygen in the presence of porous clay covered with manganese hydroxid and of an excess of ammonia, while carrying out the reaction at a pressure of about twenty atmospheres.

In testimony whereof we have hereunto set our hands in the presence of two subscribing witnesses.

ALWIN MITTASCH.
HUGO MORAWITZ.

Witnesses:
CHRISTIAN SCHNEIDER,
J. ALEC. LLOYD.